(12) United States Patent
Taft (10) Patent No.: US 8,948,292 B1
(45) Date of Patent: Feb. 3, 2015

(54) PHASE ANGLE MAPPING FOR PHASE MODULATION

(71) Applicant: Exelis Inc., McLean, VA (US)

(72) Inventor: William J. Taft, Annandale, NJ (US)

(73) Assignee: Exelis Inc., McLean, VA (US)

( * ) Notice: Subject to any disclaimer, the term of this patent is extended or adjusted under 35 U.S.C. 154(b) by 87 days.

(21) Appl. No.: 13/800,570

(22) Filed: Mar. 13, 2013

(51) Int. Cl.
*H04L 27/10* (2006.01)
*H04L 27/20* (2006.01)

(52) U.S. Cl.
CPC ..................................... *H04L 27/20* (2013.01)
USPC ........... 375/283; 375/280; 375/281; 375/279; 375/308; 375/302; 375/103; 375/104; 375/105

(58) Field of Classification Search
CPC . H04L 27/18; H04L 27/0008; H04L 27/2035; H04L 25/03834; H04L 27/2331; H04L 27/2057; H04L 27/2085; H04L 27/186; H04L 27/2071; H04L 27/2273; H04L 1/004; H04L 1/0059; H04L 25/06; H04L 25/4904; H04L 27/22; H04L 27/2017; H04L 27/12; H04L 27/2092; H04L 27/362; H04L 27/364; H04L 25/497; H04L 27/2039; H04L 27/2064; H04B 1/707; H03C 3/40; H03C 5/00; H03C 7/072; H03B 28/00
USPC ................. 375/283, 280, 281, 279, 308, 302; 332/103, 104, 105
See application file for complete search history.

(56) References Cited

U.S. PATENT DOCUMENTS

| | | | | |
|---|---|---|---|---|
| 3,739,277 A | * | 6/1973 | Schneider et al. ............ | 375/283 |
| 4,613,976 A | * | 9/1986 | Sewerinson et al. .......... | 375/279 |
| 5,260,673 A | * | 11/1993 | Pham ............................ | 332/103 |
| 5,369,378 A | * | 11/1994 | Kosaka et al. ................ | 332/104 |
| 5,483,592 A | * | 1/1996 | Ishioka et al. ........... | 379/373.01 |
| 5,535,244 A | * | 7/1996 | Nakatsu et al. ............... | 375/261 |
| 6,996,191 B1 | * | 2/2006 | Meditz .......................... | 375/308 |
| 7,035,245 B2 | | 4/2006 | Orr et al. | |
| 2004/0081255 A1 | * | 4/2004 | Yeh ............................... | 375/308 |
| 2009/0135957 A1 | * | 5/2009 | Norris et al. .................. | 375/330 |
| 2011/0051783 A1 | | 3/2011 | Cahn et al. | |

OTHER PUBLICATIONS

S. Butman et al., "Interplex Modulation," JPL Quarterly Technical Review, vol. 1, No. 1, Apr. 1971.

* cited by examiner

*Primary Examiner* — Phuong Phu
(74) *Attorney, Agent, or Firm* — Edell, Shapiro and Finnan LLC (57) ABSTRACT

In determining an angle for a phase modulation scheme, a key is generated from a prescribed set of bits contained in a symbol. The symbols have an in-phase (I) data word and a quadrature phase (Q) data word that identify coordinates of the symbols in a complex number plane. An angle is retrieved from a memory table from a storage location identified by the key. Each angle in the memory table is established in accordance with constraints under which the memory table was populated so as to be mapped to a phase angle identifying other coordinates in the complex number plane that are within a specified neighborhood about the coordinates of each of the symbols. A signal is generated to convey the symbols as phase differentials at each sample time between a reference phase and the phase angle.

23 Claims, 7 Drawing Sheets

PHASE ANGLE MAPPING FOR PHASE MODULATION

TECHNICAL FIELD

This disclosure relates to phase modulation in radio-frequency (RF) transmitters.

BACKGROUND

Phase modulation conveys information through variations in phase imparted on a carrier signal and is particularly useful when such information can be represented in a finite number of phase angles. Phase-shift keying (PSK) is an example of such modulation, in which a certain bit pattern is encoded as a phase shift or phase differential in a carrier signal. In typical early PSK systems, the number of phase angles that an encoder had to implement was small, typically eight (8) or less. However, current trends are toward representing digital data through an ever increasing number of phase differentials. For example, signal combining techniques may select a single phase to represent a number of different signals, where the phase that is selected is typically conditioned on the bit patterns of the signals that are to be combined at a given sample time. Depending on the signal combining strategy, as the number of signals that are to be combined increases, so too does the number of phases that the encoder must realize. Accordingly, techniques to minimize the computational overhead of these finer phase differential encoding process are in continual development.

SUMMARY

Described herein is a technique for determining an angle corresponding to the arctangent of a ratio of a pair of digital data words, such as to represent a symbol in a phase modulation scheme. At each sample time, a key is generated from a prescribed set of bits contained in a symbol at the sample time. The symbols obtained at the sample times have an in-phase (I) digital data word and a quadrature phase (Q) digital data word that identify coordinates of the symbols in a complex number plane. An indication of an angle is retrieved from a memory table at each sample time from a storage location in the memory table identified by the key. Each angle in the memory table is established in accordance with constraints under which the memory table was populated so as to be mapped to a phase angle identifying other coordinates in the complex number plane that are within a specified neighborhood about the coordinates of each of the symbols. A signal is generated to convey the symbols as phase differentials at each sample time between a reference phase and the phase angle.

DESCRIPTION OF EXAMPLE EMBODIMENTS

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

Mathematical expressions are contained herein and those principles conveyed thereby are to be taken as being thoroughly described therewith. It is to be understood that where mathematics are used, such is for succinct description of the underlying principles being explained and, unless otherwise expressed, no other purpose is implied or should be inferred. It will be clear from this disclosure overall how the mathematics herein pertain to the present invention and, where embodiment of the principles underlying the mathematical expressions is intended, the ordinarily skilled artisan will recognize numerous techniques to carry out physical manifestations of the principles being mathematically expressed.

The techniques described herein are directed to determining an angle corresponding to the arctangent of a ratio of a pair of digital data words with minimal computational resources being engaged. In certain embodiments, a memory table, such as a lookup table (LUT) is populated with a set of angles in association with a corresponding key for each angle. The memory table is populated under certain constraints that minimize the size of the memory table while defining a set of representative angles that closely map to the angles that would be calculated from a complete arctangent function implementation. Thus, the representative angles in the memory table are approximations that are within a defined neighborhood of the fully calculated arctangent. To retrieve an angle from the memory table, a key is generated from the digital data words under the constraints applied when the memory table was populated. The retrieved angle may be mapped to a full angle representation of the digital data words, in that a limited range of angles may be stored in the memory table. The mapped angle representation may be encoded on a carrier signal to implement a phase modulation application.

Figure 1:
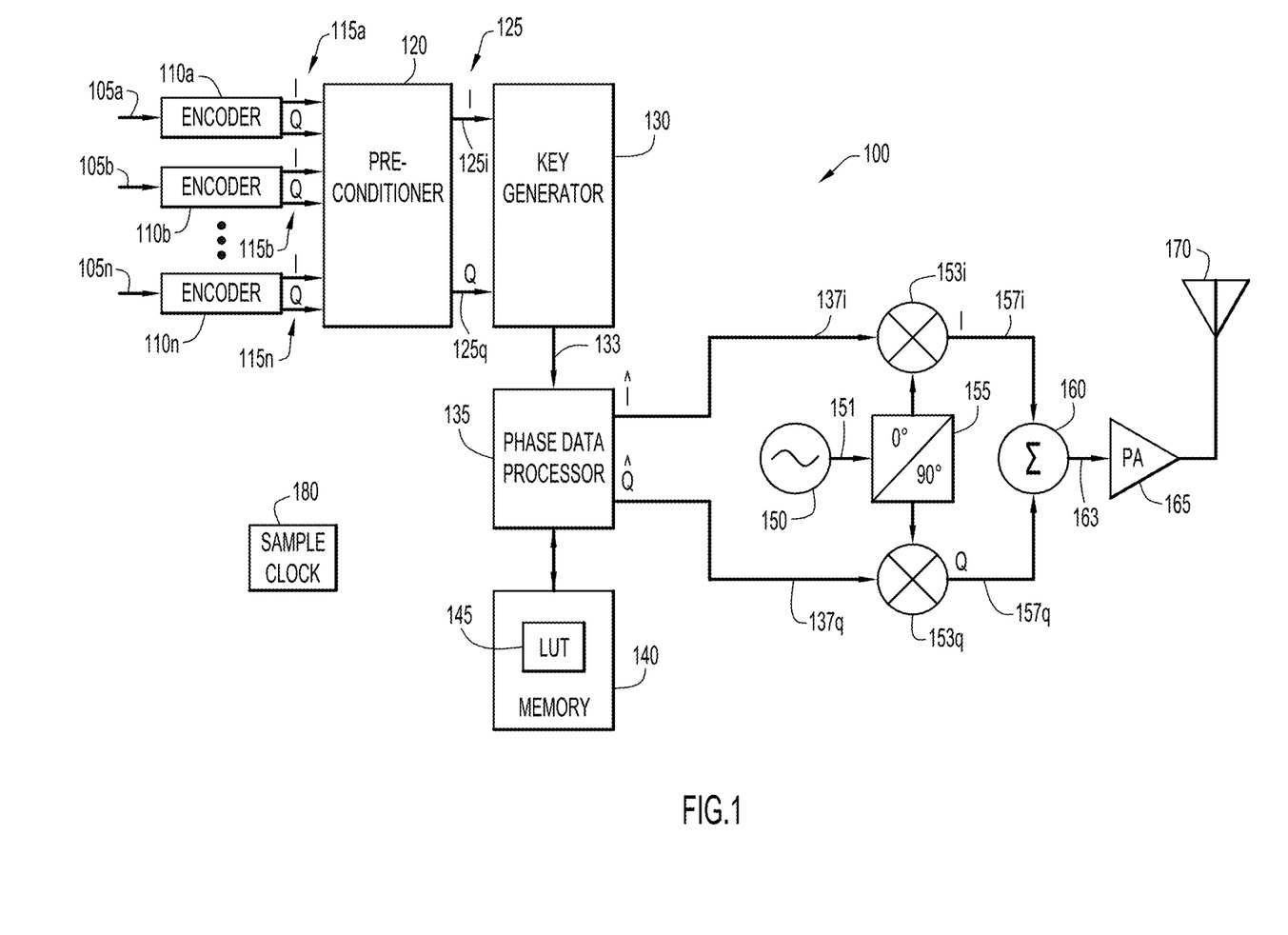
FIG. 1 is a schematic block diagram of a radio-frequency (RF) transmitter 100 in which the present general inventive concept may be embodied.

FIG. 1 is a schematic block diagram of a radio-frequency (RF) transmitter 100 in which the present invention may be embodied. Generally, an in-phase (I) component 137i and a quadrature (Q) component 137$q$ of a quadrature signal, representatively referred to herein as quadrature signal 137, are generated, such as by a phase data processor 135, to encode information represented in a baseband quadrature signal 125 as a phase state on a transmitted RF signal at each sample time of sample clock 180. As used herein, a phase state is a phase shift with respect to a reference phase, such as the phase of local oscillator 150. Quadrature signal 137 may be a sequence of transmission symbols comprising an I digital data word in I signal component 137$i$ and a Q digital data word in signal component 137$q$. Similarly, quadrature signal 125 may be a sequence of baseband symbols comprising I and Q digital data words carried in parallel I and Q signal components 125$i$ and 125$q$. Ultimately, as described below, the baseband symbols on signal 125 are encoded as a phase shift, or phase differential, on the transmitted RF signal.

Figure 2:
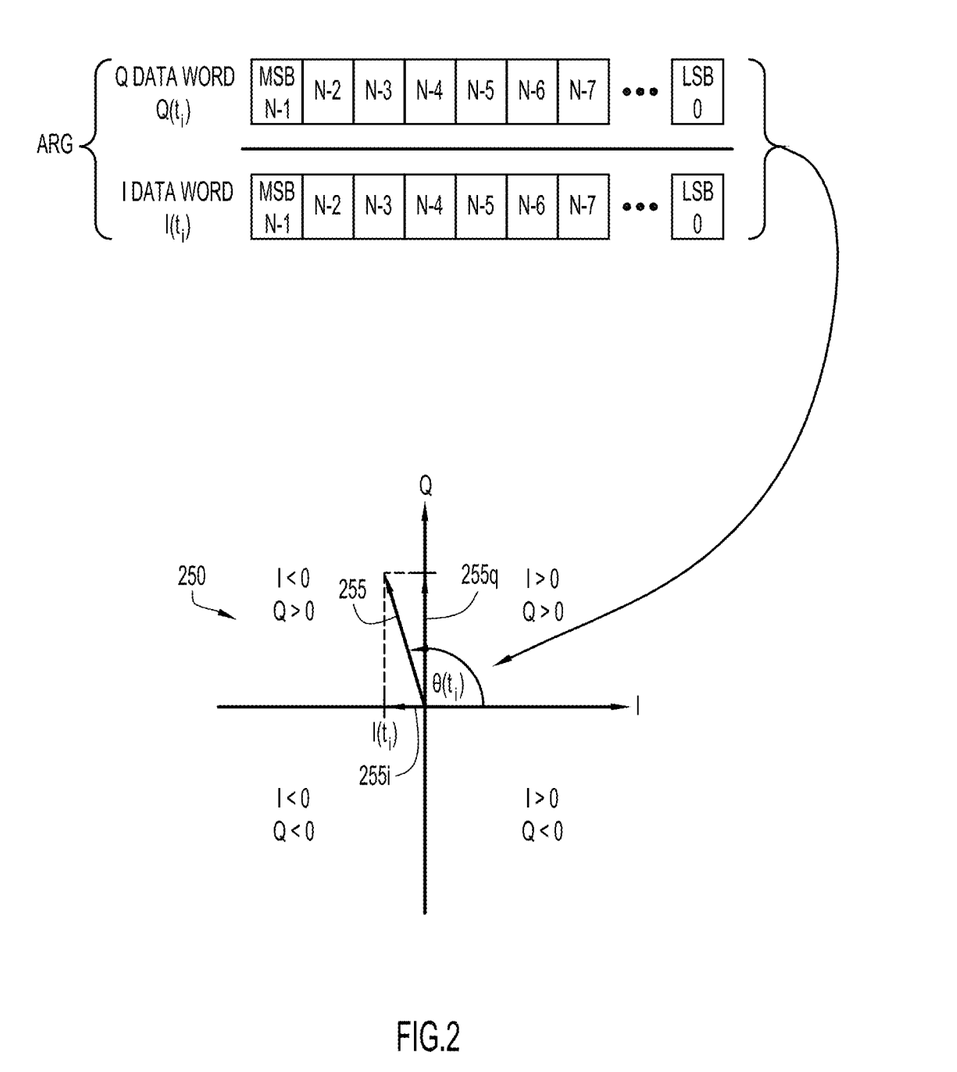
FIG. 2 is a diagram of a polar representation of symbol to be encoded in a phase modulation scheme by embodiments of the present general inventive concept.

As illustrated in FIG. 2, a quadrature signal such as quadrature signal 137 may be represented by a vector 255 in the complex number plane 250, formed as a sum of component vectors 255$i$ and 255$q$. In the case of quadrature signal 137, the component vectors 255$i$ and 255$q$ correspond to values of digital data words carried in the individual component signals 137$i$ and 137$q$, respectively. The angle $\theta(t_i)$ is given by, $$\theta(t_i) = \qquad (1)$$

$$\arg[I(t_i), Q(t_i)] = \begin{cases} \tan^{-1}[Q(t_i)/I(t_i)], & Q(t_i) \geq 0, I(t_i) \geq 0 \\ \pi - \tan^{-1}[|Q(t_i)|/|I(t_i)|], & Q(t_i) \geq 0, I(t_i) \geq 0 \\ \pi + \tan^{-1}[|Q(t_i)|/|I(t_i)|], & I(t_i) < 0, Q(t_i) < 0, \\ 2\pi - \tan^{-1}[|Q(t_i)|/|I(t_i)|], & I(t_i) \geq 0, Q(t_i) < 0 \\ \pi/4, & I(t_i) = 0, Q(t_i) = 0 \end{cases}$$

where $t_i$ is the time of the $i^{th}$ symbol, $I(t_i)$ and $Q(t_i)$ are the quadrature baseband signal components at time $t_i$ each having an amplitude represented by the vector magnitude of component vectors 255$i$ and 255$q$, respectively. Thus, the angle $\theta(t_i)$ can be used as a phase state, i.e., encoded on local oscillator signal 151 as a phase shift equal to $\theta(t_i)$.

As illustrated in FIG. 1, encoding a phase state onto a signal may be achieved by a quadrature mixing process. In the example embodiment illustrated, local oscillator 150 generates a signal 151 at an RF carrier frequency. Signal 151 is quadrature split through phase splitter 155 and the split signal components may be provided to mixers 153$i$ and 153$q$. Signal components 137$i$ and 137$q$ are also provided to mixers 153$i$ and 153$q$, respectively, by which the phase state on signal 137 is onto carrier signal 151. The phase-encoded quadrature signal components 157$i$ and 157$q$ may be summed to form a phase-encoded information bearing signal 163, which may be amplified by power amplifier 165 and transmitted, such as by way of antenna 170. It is to be understood that while certain operations of transmitter 100 have been described as if implemented in the analog signal domain, the present invention is not so limited. Typically, most, if not all of the operations of exemplary transmitter 100 can be performed in the digital domain and the scope of the present invention is intended to encompass digital, analog and mixed implementations of transmitter 100. Additionally, other modulation system arrangement may be used with the present invention. For example, local oscillator 150 phase splitter 155 and mixers 153$i$ and 153$q$ may be replaced by a numerically controlled oscillator (NCO) and the phase angle may be encoded as shift in the NCO output.

In certain embodiments, the phase selected to convey the information in the transmitted signal is computed from an angle retrieved from a lookup table (LUT) 145 stored in a memory device 140. Phase data processor 135 may retrieve the angle from the table at an address associated with a key 133 provided by a key generator 130. Key generator 130 may generate key 133 from 1 and Q data words of baseband signal 125, such as by techniques described below. Using the retrieved angle, phase data processor 135 computes $\theta(t_i)$=arg $[I(t_i), Q(t_i)]$, and provides suitable data words $\hat{I}(t_i)$ and $\hat{Q}(t_i)$ on signal 137 as the phase state to be encoded. That is, the actual phase state encoded on the carrier signal is $\hat{\theta}(t_i)$=arg[$\hat{I}(t_i)$, $\hat{Q}(t_i)$]. Accordingly, depending on constraints under which LUT is populated, the symbol transmitted by phase state $\hat{\theta}(t_i)$ may be an approximation that is within a neighborhood of the symbol that would have been transmitted had $\theta(t_i)$ been encoded.

While various phase-encoding systems use only a small number of phase states, others require a larger number, such as when the phase state is intended to represent a combination of signals. Signal combining, as used herein, is a technique that evaluates the signal states $\lambda_j$ across a set of signals $s_j(t_i)=f(t_i, \lambda_j)$ that are to be combined at time $t=t_i$ and selects or otherwise determines in accordance a particular combination scheme a combination state to represent all of the signals states $\lambda_j$ for time $t_i$. A combination signal $s_o(t)$, e.g., quadrature signal 125, is thus a representation of all the signals across time:

$$s_o(t) = f(t_i, \hat{\lambda}_i), \forall i = \{0, 1, 2, \ldots n_X\}, \qquad (2)$$

where $n_X$ is an arbitrary termination sample. One such combining technique, referred to herein as computed phase angle combining (COPAC) determines the phase state from:

$$\theta(t_i) = \arg\left(\frac{\sum_{j=1}^{N} w_j Q_j(t_i)}{\sum_{j=1}^{N} w_j I_j(t_i)}\right) = \arg\left(\frac{\sum_{j=1}^{N} w_j C_j(t_i) \sin \theta_j}{\sum_{j=1}^{N} w_j C_j(t_i) \cos \theta_j}\right), \qquad (3)$$

where $w_j$ is a weighting coefficient for the $j^{th}$ signal that gives signal power preference to a particular signal, $C_j(t_i)$ is a chip state of a spreading code for the $j^{th}$ signal and $\sin \theta_j$ and $\cos \theta_j$ represent the information in the $i^{th}$ binary phase-shift keying (BPSK) signal that is to be conveyed by the encoded transmission. In the COPAC scheme, the signal states $\lambda_j$ being evaluated are the angles $\theta_j$ representing the baseband symbols and the chip state $C_j$ of the spreading code at each sample time $t_i$. The combining scheme computes a single phase state $\theta(t_i)$ to represent the combination of signals by summing weighted I signal components, summing weighted Q components and computing the angle from the ratio of the sums.

In FIG. 1, a plurality of information signals 105$a$-105$n$, representatively referred to herein as information signal(s) 105, are encoded as quadrature signals 115$a$-115$n$, representatively referred to herein as quadrature signal(s) 115 by encoders 110$a$-110$n$, representatively referred to herein as encoders(s) 110. Preconditioner 120 implements a process by which a representative signal state is selected for all signals 105 such as by, for example, COPAC signal combining described above. When so embodied, preconditioner 120 may provide $I(t_i)=\Sigma_{j=1}^{N} w_j C_j(t_i) \cos \theta_j$ on signal component 125$i$ and $Q(t_i)=\Sigma_{j=1}^{N} w_j C_j(t_i) \sin \theta_j$ on signal 125$q$. Key generator 130 generates a key 133 from these signal components and the representative signal state $\hat{\theta}(t_i)$ is computed from phase data processor 135, where $|\theta(t_i)-\hat{\theta}(t_i)|<\epsilon$ and $\epsilon$ is a tolerable error defining a neighborhood about the symbol represented by $\theta(t_i)$. In certain applications, the phase encoded signal is a constant envelope signal such that $A=\sqrt{\hat{I}^2(t_i)+\hat{Q}^2(t_i)}$, where A is a constant signal amplitude over all $t_i$.

It is to be understood that the present invention is not limited to COPAC or to any other combining technique. Moreover, the present invention may be embodied with or without a signal combining component. The skilled artisan will recognize numerous applications in which the present invention may be implemented without departing from the spirit and intended scope thereof.

It is to be noted that the technique disclosed herein, when used with a spread spectrum BPSK signal combining technique such as COPAC, no additional measures need be taken at the decoder side of the transmitted signal. The individual signals represented in combination by the single phase encoded on the transmitted signal will be properly recovered by the correlative techniques already implemented on the receiving end.

LUT 145 is populated under a set of constraints to contain a set of phase states and an associated key for each of those phase states. The number of phase states that must be represented in a particular system is, of course, application specific. In certain embodiments, LUT 145 contains values only for the arctangent operation in the argument function of Eq. (1) and phase data processor 135 makes the necessary phase shifts that complete the argument function based on the arithmetic signs of $I(t_i)$ and $Q(t_i)$ and which of $I(t_i)$ and $Q(t_i)$ serves as the numerator N of the ratio and which serves as the denominator D of the ratio. Key generator 130 may generate key 133 from bit operations across operands N and D of ratio N/D once $I(t_i)$ and $Q(t_i)$ have been so assigned. This ratio may be characterized by known bit patterns, i.e., the keys, and then mapped to a phase state. If the ratio characterization is capable of mapping the quotient N/D to a phase value that is sufficiently close to the fully carried out calculation of arctan (N/D), then the modulated phase error is small. The size of LUT 145 may be reduced by exploiting phase angle symmetry so that only a subset of possible phase angles need by mapped and stored in LUT 145.

Figure 3:
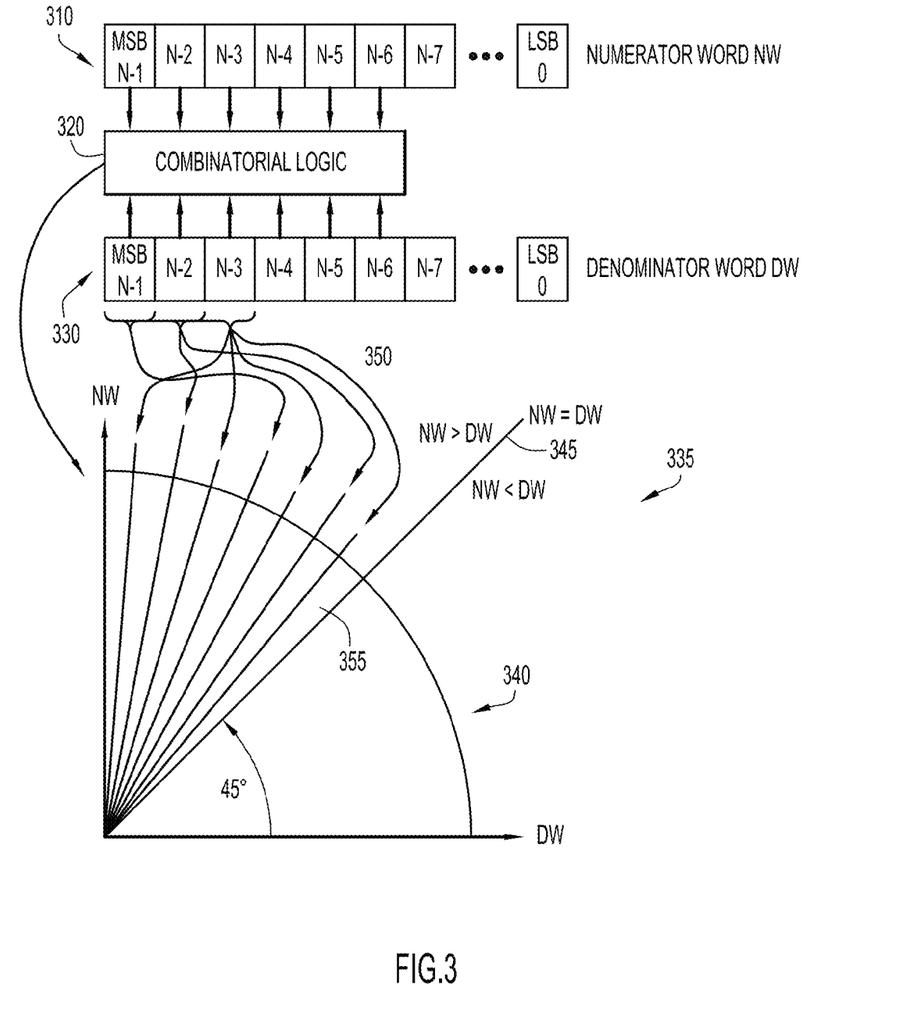
FIG. 3 is a diagram illustrating aspects underlying the population of a memory table in embodiments of the present general inventive concept.

FIG. 3 is a diagram illustrating exemplary aspects underlying the population of LUT 145. Phase states are associated with keys generated by operations on individual bits in the data words 310 and 330 that form the quotient for which the arctangent is to be computed. The keys and the associated angles are determined under certain constraints that seek to minimize the size of the LUT while defining a set of representative angles that closely map to the angles that would be calculated from a complete arctangent function implementation. This may be achieved by finding the smallest set of representative angles that are within a particular angular neighborhood of the fully computed angles.

To keep the size of LUT 145 small, the angles that are ultimately stored may be confined to particular angular region 350, such as between 45° and 90° in first quadrant 340 of number plane 335. Accordingly, as one constraint, the numerator data word 310 must be greater than or equal to denominator data word 330, in which case the minimum ratio is 1, corresponding to an angle of 45°, and the maximum ratio is infinite, corresponding to an angle of 90°. However, it is to be understood that regions other than between 45° and 90° can be used; the present invention is not limited by such selection.

Keys may be generated by bitwise operations performed through combinatorial logic 320, either in circuitry or as operations performed by processor instructions executing on a processor. The bitwise operations and the bits on which those operations are to be performed are chosen so that the key characterizes the ratio of numerator data word 310 to denominator data word 330 and maps the angle corresponding to that characterized ratio to within an angular neighborhood of the exactly computed angle.

In the example of FIG. 3, a number of upper bits of numerator data word 310 and denominator data word 330 are processed through combinatorial logic 320 to characterize the ratio of numerator data word 310 to denominator data word 330. For example, combinatorial logic 320 may implement bit operations that establish ranges of possible values for the ratio depending on the result of the bit operation, e.g., if the operation results in true (1), the ratio computes to one set of possible values and if false (0), the ratio computes to another set of values. The characterization of the ratio, i.e., the sets of values, may be mapped into region 350 to define subregions 335. The angular extent of subregion 335 defines the size of the angular neighborhood 355 and, as such, subregion 335 will be referred to herein as neighborhood 335. The size of neighborhood 335 may be evaluated against an error criterion, another constraint for populating LUT 145 and, if the error criterion is not met, i.e., the size of neighborhood 335 is too large, the number of bits used to characterize the ratio may be increased and the process is repeated until the size of neighborhood 335 meets the error constraint.

Figure 4:
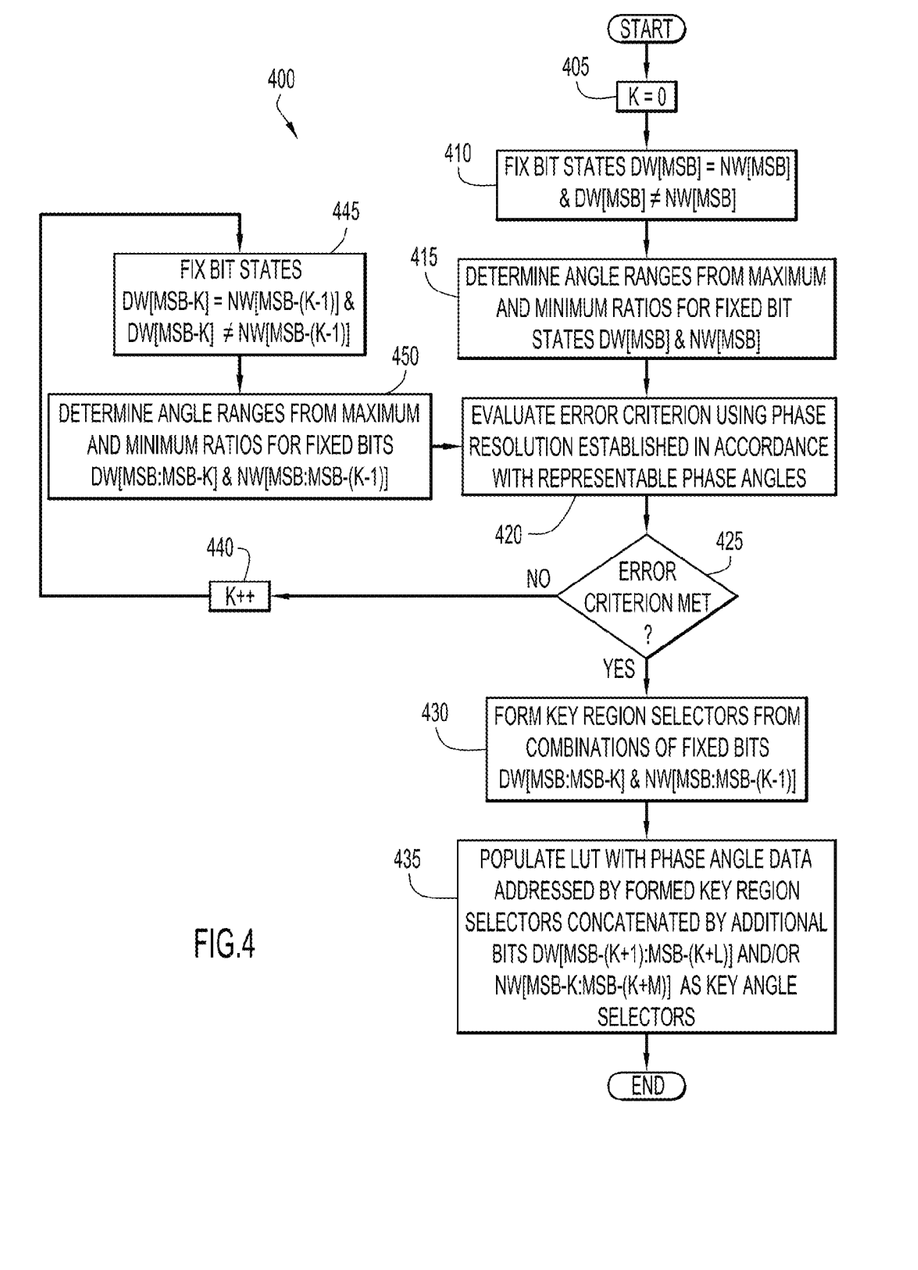
FIG. 4 is a flow diagram of a memory table population process for implementation in embodiments of the present general inventive concept.

FIG. 4 is a flow diagram of an exemplary LUT population process 400 for implementation in embodiments of the present invention. In operation 405, an index k is initialized to zero, which is used in subsequent operations. In operation 410, a bit operation between the MSBs of both the numerator data word 310 and the denominator data word 330 is performed that tests for a condition on which region 350 is to be subdivided. For example, the MSBs may be tested for equality, in which case the bit operation may be an exclusive-OR (XOR) operation. The result in this example case would be a digit of one (1) if the bits are equal and a zero (0) if the bits are not equal. With the result of this bit operation as the MSB of the key, one of two possible angle ranges is selected depending on this bit state. If the MSB of the key is a one (1), then the MSB of the numerator data word is equal to the MSB of the denominator data word, which corresponds to a ratio of the form 1XXXX . . . /1XXXX . . . , where X indicates a bit that can be arbitrarily assigned and those bits taking on specific values, i.e., not marked X, are referred to herein as being fixed. On the other hand, if the MSB of the key is a zero (0), then the MSB of the numerator data word is not equal to the MSB of the denominator data word, which corresponds to a ratio of the form 1XXXX . . . /0XXXX . . . . It is to be noted that the ratio 0XXXX . . . /1XXXX . . . is excluded due to the constraint that the numerator data word must be greater than the denominator data word. Additionally, since the ratio 0XXXX . . . /0XXXX . . . includes indeterminate values, an additional constraint for populating LUT 145 may be that the MSB of the numerator data word is one (1).

In the case where the MSBs are equal, the maximum and minimum ratios are defined by 1111 . . . /1000 . . . a ratio of approximately two (2), corresponding to an angle of approximately 63°, and 1000 . . . /1000 . . . a ratio of one (1) corresponding to an angle of 45°. The maximum and minimum ratios for the case where the MSBs are not equal are defined by 1111 . . . /0000 . . . , which is infinite and corresponds to an angle of 90°, and 1000 . . . /0111 . . . , which is a ratio of approximately one (1) corresponding to an angle of 45°. This scenario divides region 350 into subregions delineated at angles of 45°, 63° and 90°.

As demonstrated above, the regions defined by specified bit operations are found through the maximum and minimum ratio for each combination. The maximum ratio is obtained by setting the numerator word to its maximum value as constrained by the fixed bits, i.e., those involved in the bit operations characterizing the ratio, and setting the denominator word to its minimum value under the constraints of the fixed bits and the constraint that the denominator word cannot exceed the numerator word. Conversely, the minimum ratio is obtained by setting the numerator word to its minimum value as constrained by the fixed bits and setting the denominator word to its maximum value under the constraint of the fixed bits and the constraint that the denominator word cannot exceed the numerator word.

In operation 420, an error criterion is evaluated against the angle resolution provided by the bits selected and the bitwise operations selected. If the error criterion is not met, meaning that the neighborhood is to large, as determined in operation 425, index k is incremented in operation 440, and LUT population process 400 transitions to operation 445, where additional bits are added into the key formation. In the illustrated example, the MSB of numerator data word is evaluated against the bit in position MSB-1 of denominator data word. If the bit operation is once again an XOR to determine whether the two bits are equal, the following ratios, in which two bits are fixed, can be represented: a first set corresponding to true results of the previous operation tested, i.e., MSBs of both numerator and denominator data words being equal: 11XXX/11XXX, 11XXX, 10XXX and a second set corresponding to the false case in the previous test, i.e., where the MSBs of both numerator and denominator data words are not equal: 11XXX/01XXX, 10XXX, 00XXX. In operation 450, the angle ranges given these fixed bit configurations are determined in a manner similar to that performed in operation 415. The maximum and minimum possible values for each ratio defines more angular subregions: 11111 . . . /11000 . . . 11000 . . . /11000 . . . , 11111 . . . /10000 . . . , 10000 . . . /10000 . . . , 11111 . . . /01000 . . . , 10000 . . . /01111 . . . , 11111 . . . /00000 . . . , 10000 . . . /00111 . . . . For purposes of providing a numerical example, a ten-bit word length produces ratios of, respectively, 1.33 corresponding to approximately 53°, 1 corresponding to 45°, 2 corresponding to 63°, 1 corresponding to 45°, 4 corresponding to 76°, 1 corresponding to 45°, infinity corresponding to 90° and 2 corresponding to 63°. Accordingly, region 350 is subdivided by boundaries at 53° degrees, 63° degrees, and 76° degrees, with 45° degrees and 90° degrees being the outermost boundaries. Process 400 then transitions to operation 420 where these boundaries are compared to the error criterion. If the error criterion is still not met, as determined in operation 425, the process repeats the loop comprising operations 440, 445, 450, 420 and 425 until it is determined that the error criterion is met.

Figure 5:
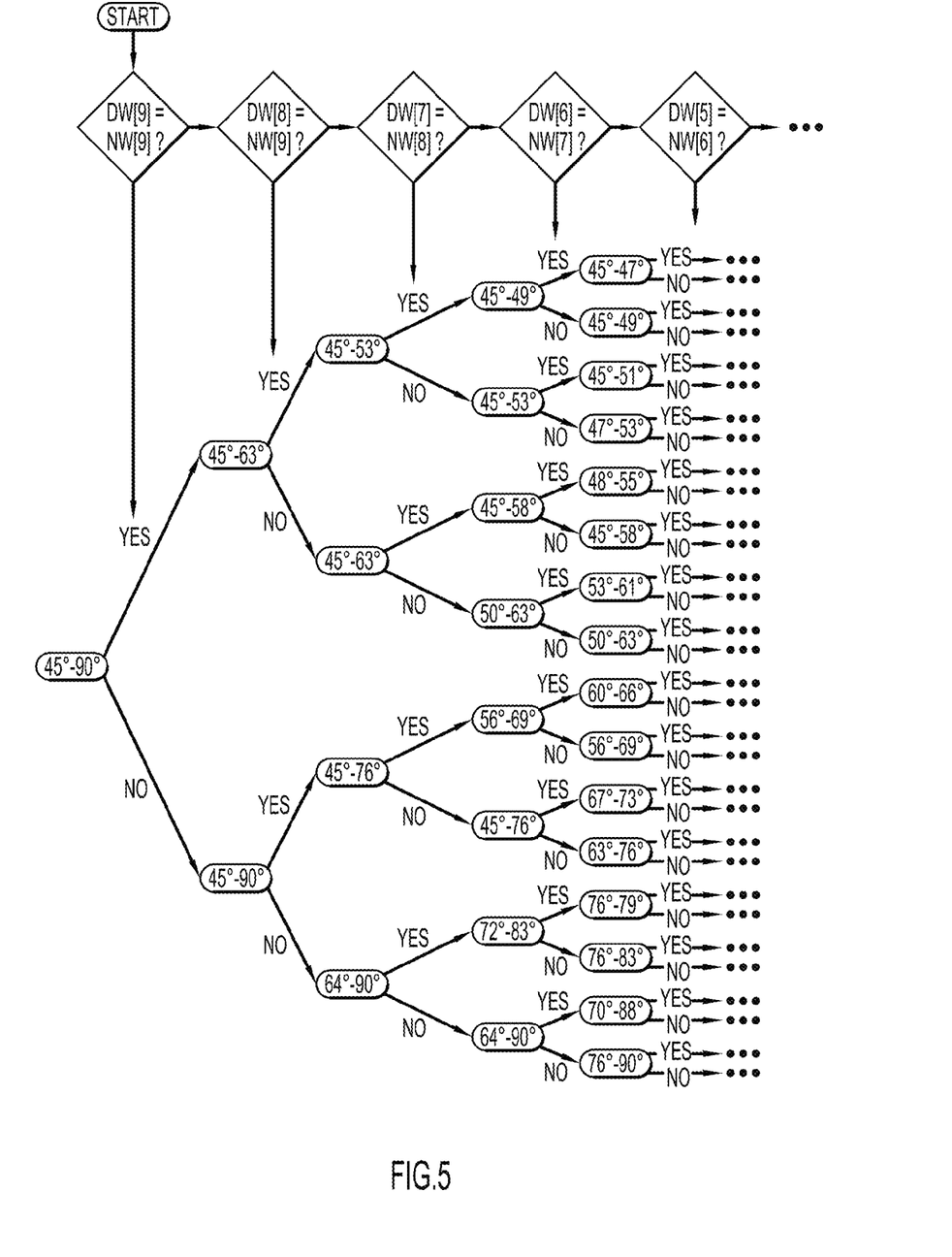
FIG. 5 is a binary tree diagram illustrating aspects of a memory table population process in embodiments of the present general inventive concept.

FIG. 5 is a diagram of a binary tree 500 that is based on whether the bits indicated in each decision block of flow 510 are equal, where the values are indicated assuming 10 digit numerator and denominator data words. As illustrated in the figure, as more bits are added to form the key, the region is divided into smaller subregions. The branching of the tree terminates when the size of the neighborhood meets the error criterion.

In another technique, the first 3 MSBs of numerator data word are evaluated against the three bits following the MSB of the denominator data word. If the bit operation is once again an XOR to determine whether the three bits in the numerator and denominator words are equal, the ratios given in Table 1, in which a total of four bits are now fixed, can be represented:

TABLE 1

| XOR Result | Possible Numerator | Possible Denominator | Maximum Ratio | Minimum Ratio | Maximum Angle (Degrees) | Minimum Angle (Degrees) |
| --- | --- | --- | --- | --- | --- | --- |
| 000 | 1111XXX | 1111XXX | 1.07 | 1 | 46.9 | 45 |
| 001 | 111XXXX | 1110XXX | 1.14 | 1 | 48.7 | 45 |
| 010 | 11XXXXX | 110XXXX | 1.33 | 1 | 53.1 | 45 |
| 011 | 11XXXXX | 110XXXX | 1.33 | 1 | 53.1 | 45 |
| 100 | 1XXXXXX | 10XXXXX | 2 | 1 | 63.4 | 45 |
| 101 | 1XXXXXX | 10XXXXX | 2 | 1 | 63.4 | 45 |
| 110 | 1XXXXXX | 10XXXXX | 2 | 1 | 63.4 | 45 |
| 111 | 1XXXXXX | 10XXXXX | 2 | 1 | 63.4 | 45 |

In Table 1, the assumption is made that the MSBs of numerator and denominator data words are equal. Instead of a binary tree, the angle resolution, as represented by a single angle in Table 1, can be assessed for the error criterion. The maximum and minimum possible values for each ratio defines more angular subregions, as can be seen from Table 1: 1111XXX . . . /1111XXX . . . 111XXX . . . /1110XXX . . . , 11XXXXX . . . /110XXXX . . . , 11XXXXX . . . /110XXXX . . . , 1XXXXX . . . 110XXXXX . . . , 1XXXXX . . . 110XXXXX . . . , 1XXXXXX . . . /10XXXXXX . . . , 1XXXXXX . . . /10XXXXXX . . . For purposes of providing a numerical example, a ten-bit word length produces ratios with ranges of, respectively, 1 to 1.07 corresponding to an angular range of approximately 2°, 1 to 1.14, corresponding to an angular range of approximately 4°, two ratios with ranges of 1 to 1.33, corresponding to an angular range of approximately 13°, and 4 ratios with ranges of 1 to 2, corresponding to an angular range of approximately 18°.

Figure 6:
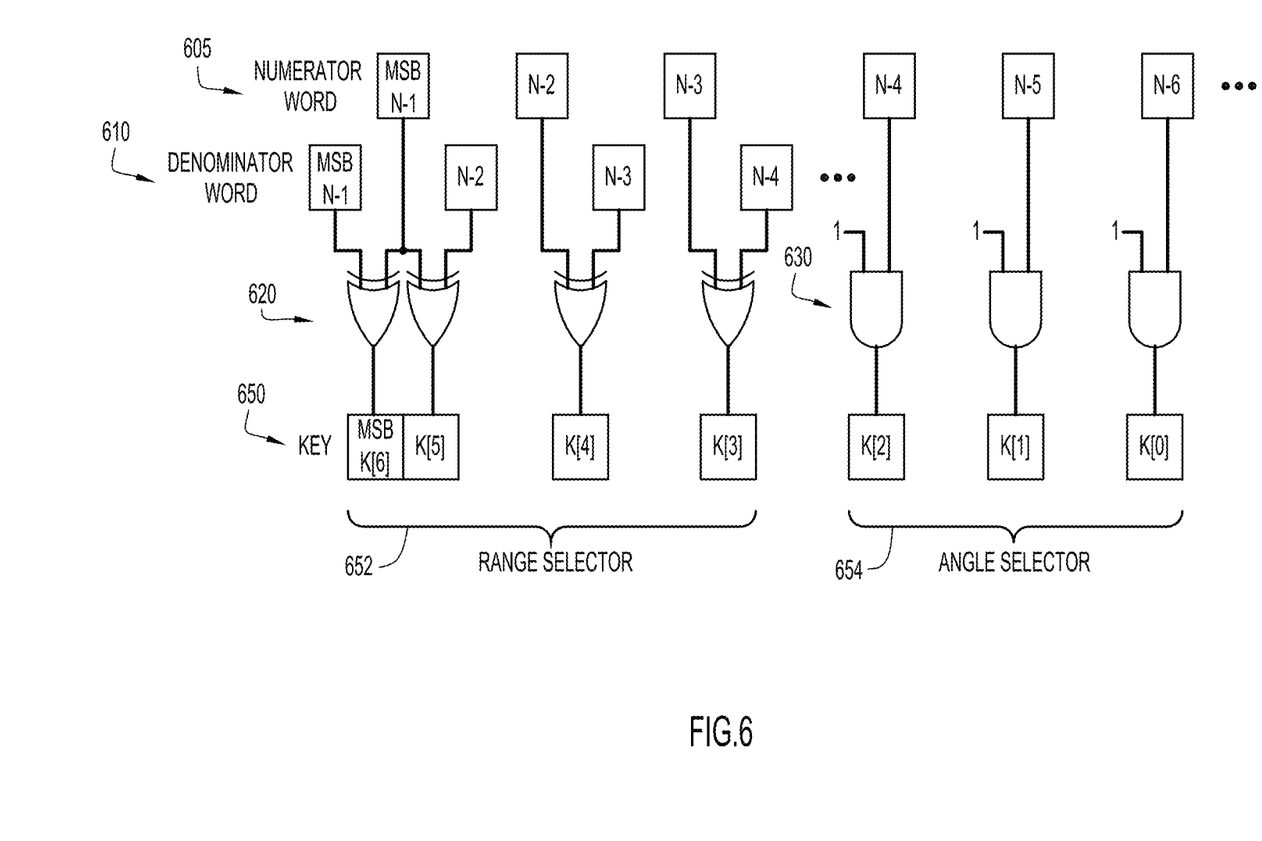
FIG. 6 is a logical schematic diagram illustrating bit operations in generating a key in embodiments of the present general inventive concept.

Returning to FIG. 4, if it is determined in operation 425 that the error criterion is met, process 400 transitions to operation 430 by which the full set of keys is generated. As illustrated in FIG. 6, a key 650 may be formed of a concatenation of range selector value 652, which refers to the subregion in which the angle is represented with an angle selector value 654 which identifies the angle within that subregion. Range selector value 652 forms the upper bits of key 650 and is determined based on whether the indicated bits of numerator data word 605 and denominator data word 610 are equal. The angle selector value 654 is concatenated on the range selector value 654 and is computed from a number of lower bits of numerator data word 605. In the example of FIG. 6, the angle selector bits are simply the next three bits of numerator data word 605. It is to be understood however that the present invention is not so limited. In this configuration, the size of the neighborhood is the size of the region indicated by range selector value 652 divided by the number of angles that can be selected in that region, i.e., the number of possible bit combinations for angle selector value 654. Accordingly, the error criterion for LUT population process 400 described above may by the size of the regions 355 divide by the number of angles that are be selected from within the regions.

In operation 435 of LUT population process 400, a phase angle is associated with each key. The angles may be computed from the arctangent of the ratio of the numerator and denominator data words from which the key was generated. Each key then selects the corresponding angle from LUT 145, which is accurate to within the size of the neighborhood.

With LUT 145 populated, transmitter 100 can execute a phase encoding process to encode a phase state corresponding to baseband symbols 125 onto carrier signal 151. To form the key, however, the I and Q data words that are to be encoded must be transformed to correspond to the constraints under which LUT 145 was populated. Under the constraints described above with reference to LUT population process 400, for example, the keys are only valid for angles between 45° and 90°. Thus, the I and Q data words must be transformed so that the numerator data word is greater than or equal to the denominator data word. Additionally, the MSB of the numerator data word must be one (1). Moreover, the angles in LUT 145 correspond to a ratio of magnitudes and, accordingly, sign bits must be stripped from the I and Q data words. However, information must be maintained on any transformation operations that are performed so that the angle retrieved from LUT 145 can be subsequently mapped to the proper angle indicated by the I and Q data words.

Figure 7:
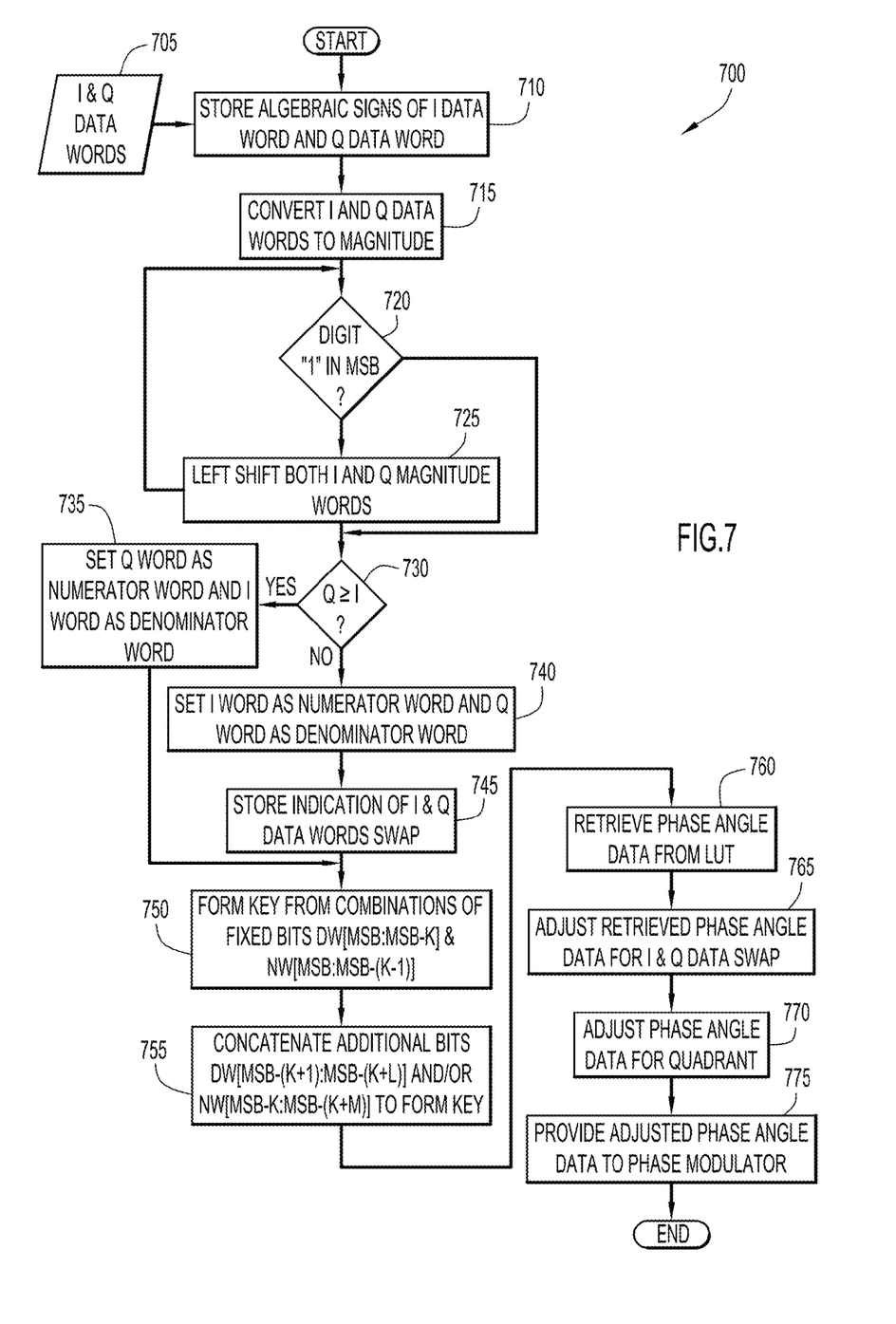
FIG. 7 is a flow diagram of a phase encoding process for implementation in embodiments of the present general inventive concept.

FIG. 7 is a flow diagram of an exemplary phase encoding process 700 by which the present invention may be embodied. The operations of encoding process 700 may be executed at each sample time $t_i$ at which a new quadrature signal sample in the form of an I data word and a Q data word are provided to the process, as illustrated at block 705. In operation 710, the algebraic signs of the I and Q data words are determined and indications of such are stored in temporary memory. The algebraic signs indicate in which quadrant of the complex number plane the encoded angle will lay. In operation 715, the I and Q data words are converted to magnitudes, such as by stripping the numbers of their respective sign bits. In operation 720, it is determined whether a digit one (1) is in the MSB position in either the I or Q data words. If not, both I and Q data words are left shifted until such is the case, as performed by the processing loop of operations 725 and 720. The number of left shifts need not be tracked since the net effect on the ratio is zero. Once a one (1) bit state is positioned in the MSB of either the I data word or the Q data word, it is determined in operation 730 whether the Q data word is greater than or equal to the I data word. If this condition is met, encoding process 700 transitions to operation 735 in which the Q data word is assigned to be the numerator data word in the ratio and the I data word is assigned to be the denominator data word. If, on the other hand, it is determined in operation 730 that the Q data word is less than the I data word, encoding process 700 transitions to operation 740 in which the I data word is assigned to be the numerator data word and the Q data word is assigned to be the denominator data word. In operation 745, an indication of this swap is stored in temporary memory. In operation 750, the key into LUT 145 is computed in accordance to the combinatorial logic and bit position constraints under which LUT 145 was populated. In keeping with the LUT population example above, the key is formed from the four MSBs of the numerator data word and the five MSBs in the denominator data word, as illustrated in FIG. 5. In operation 755, the key is completed by concatenating the region selector value with angle selector value taken from the next three bits in the numerator data word. In operation 760, an angle is retrieved from LUT 145 using the key. In operation 765, the retrieved angle is adjusted if I and Q data words were swapped in operation 740. If such swap was made, then the retrieved angle is subtracted from 90°. In operation 770, the stored algebraic signs are consulted to determine the quadrant and the corresponding phase shift is applied, such as those indicated in the argument function of Eq. (1), to produce the phase state. In operation 775, the phase state is provided to the phase modulator, in the form of I and Q data words that realize the angle.

The skilled artisan will recognize various phase-encoded transmission techniques from this general description. Moreover, as will be appreciated from this disclosure, the present invention is limited neither to any particular phase modulation technique nor to phase modulation specifically. It is to be understood that the present invention can be implemented in a wide variety of systems, including those for applications outside the communications art, without departing from the spirit and intended scope thereof.

As indicated above, much if not all of transmitter 100 may be implemented in the digital domain. Accordingly, the functional components of transmitter 100 illustrated in FIG. 1, e.g., modulators 110, preconditioner 120, key generator 130, phase data processor 135, mixers 153 and summer 160, and others, may be implemented in fixed or programmable logic including, but not limited to, discrete logic elements, logic gate arrays, application specific integrated circuits and programmable microprocessors and/or microcontrollers. Memory 140 may include storage for processor instructions as well as data, and such processor instructions may be executed by a processor to perform the functionality of various components illustrated in FIG. 1.

Certain embodiments of the present invention concept provide for the functional components to manufactured, transported, marketed and/or sold as processor instructions encoded on computer-readable media. The present invention, when so embodied, can be practiced regardless of the processing platform on which the processor instructions are executed and regardless of the manner by which the processor instructions are encoded on the computer-readable medium.

It is to be understood that the computer-readable medium described above may be any non-transitory medium on which the instructions may be encoded and then subsequently retrieved, decoded and executed by a processor, including electrical, magnetic and optical storage devices. Examples of non-transitory computer-readable recording media include, but not limited to, read-only memory (ROM), random-access memory (RAM), and other electrical storage; CD-ROM, DVD, and other optical storage; and magnetic tape, floppy disks, hard disks and other magnetic storage. The processor instructions may be derived from algorithmic constructions in various programming languages that realize the present invention concept as exemplified by the embodiments described above.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. A method, performed by an apparatus, comprising:
generating a key at each of a plurality of sample times from a prescribed set of bits in respective symbols obtained at each of the sample times, each of the symbols comprising an in-phase (I) digital data word and a quadrature phase (Q) digital data word identifying coordinates of the corresponding symbols in a complex number plane;
retrieving an indication of an angle from a memory table at each of the sample times at a storage location therein identified by the key generated at the corresponding one of the sample times, each angle in the memory table being established in accordance with constraints under which the memory table was populated so as to be mapped to a phase angle identifying other coordinates in the complex number plane that are within a specified neighborhood about the coordinates of each of the symbols; and
generating a signal to convey the symbols as phase differentials at each of the sample times between a reference phase and the phase angle.

2. The method of claim 1 further comprising:
transforming the symbols at each of the sample times into a form from which the set of bits is identified in accordance with the constraints under which the memory table was populated; and
mapping the retrieved angle at each of the sample times to the corresponding phase angle in accordance with information obtained from the symbols in the transforming thereof.

3. The method of claim 2, wherein transforming the symbols at each of the sample times comprises:
obtaining algebraic signs on the I and Q data words from bits therein;
stripping the I and Q data words of the bits from which the algebraic signs thereof were obtained; and
identifying a quadrant of the complex number plane in which the corresponding one of the symbols lies from the algebraic signs on the I and Q data words; and
adding the identified quadrant to the information obtained during the transforming so that the mapping can map the retrieved angle to the identified quadrant as the phase angle.

4. The method of claim 3, wherein transforming the symbols at each of the sample times comprises:
bit-shifting the stripped I and Q data words an equal number of bits leftward until a one (1) digit is located in the most significant bit (MSB) position of one or both of the I and Q data words;
determining which, if any, of the bit-shifted I and Q data words is greatest in value;
assigning, if one of the bit-shifted I and Q data words is greater than the other, the greatest of the bit-shifted I and Q data words as the numerator data word of a ratio and the other of the bit-shifted I and Q data words as the denominator data word of the ratio;
indicating, only in response to the I data word being assigned as the numerator data word and the Q data word being assigned as the denominator data word, an operand swap; and
adding the operand swap indication to the information obtained during the transforming so that the mapping can subtract the retrieved angle from 90°.

5. The method of claim 4, wherein generating the key at each of the sample times further comprises:
identifying the set of bits as a set of bits from the numerator data word and another set of bits from the denominator data word, where the set of numerator bits and the set of denominator bits are identified in accordance with the constraints under which the memory table was populated;
performing bit operations using the set of numerator bits and the set of denominator bits as operands, the bit operations being specified by the constraints under which the memory table was populated; and
generating the key from results of the bit operations in accordance with the constraints under which the memory table was populated.

6. The method of claim 5, wherein generating the key from the results of the bit operations at comprises:
storing results of a first set of the bit operations that defines an angular region in the complex number plane in accordance with the constraints under which the memory table was populated;
storing results of a second set of the bit operations that establishes an angle within the angular region to within the specified neighborhood of a computed arctangent of the ratio, the first set of bit operations and the second set of bit operations being specified by the constraints under which the memory table was populated; and
concatenating the results of the first set of the bit operations with the results of the second set of the bit operations to form the key.

7. The method of claim 6, wherein the first set of bit operations generates an indication as to whether the identified bits in the numerator data word are respectively equal to the identified bits in the denominator data word.

8. The method of claim 6, wherein the second set of bit operations replicates the identified bits in the numerator data word.

9. The method of claim 1 further comprising:
receiving a plurality of baseband symbols at each of the sample times, each of the baseband symbols comprising an I data word and a Q data word;
preconditioning the baseband symbols in accordance with a signal combining scheme to produce the symbol.

10. The method of claim 9, wherein preconditioning the baseband symbols comprises:
weighting the I and Q data words of each of the baseband symbols by a corresponding coefficient in accordance with the signal combining scheme;
summing the weighted I data words of the baseband symbols as the I data word of the transmission symbol; and
summing the weighted Q data words of the baseband symbols as the Q data word of the transmission symbol.

11. The method of claim 10 further comprising:
transmitting the phase-encoded signal as a constant envelope radio-frequency (RF) communication signal.

12. An apparatus comprising:
a memory to store a memory table having stored therein a plurality of angles in respective storage locations identified by respective keys, each angle in the memory table being established in accordance with constraints under which the memory table was populated so as to be mapped to a phase angle that is within a specified neighborhood about coordinates of a symbol in a complex number plane; and
a processor configured to:
generate a key at each of a plurality of sample times from a prescribed set of bits in respective symbols obtained at each of the sample times, each of the symbols comprising an in-phase (I) digital data word and a quadrature phase (Q) digital data word identifying the coordinates thereof in the complex number plane;

retrieve an angle from the memory table at each of the sample times at the storage location therein identified by the generated key; and generate a signal to convey the symbols as phase differentials at each of the sample times between a reference phase and the phase angle.

13. The apparatus of claim 12, wherein the processor is further configured to:

transform the symbols at each of the sample times into a form from which the set of bits is identified in accordance with the constraints under which the memory table was populated; and map the retrieved angle at each of the sample times to the corresponding phase angle in accordance with information obtained from the symbols in the transforming thereof.

14. The apparatus of claim 13, wherein the processor is further configured to:

obtain algebraic signs on the I and Q data words from bits therein;

strip the I and Q data words of the bits from which the algebraic signs thereof were obtained; and identify a quadrant of the complex number plane in which the corresponding one of the symbols lies from the algebraic signs on the I and Q data words; and add the identified quadrant to the information obtained during the transforming so that the mapping can map the retrieved angle to the identified quadrant as the phase angle.

15. The apparatus of claim 14, wherein the processor is further configured to:

bit-shift the stripped I and Q data words an equal number of bits leftward until a one (1) digit is located in the most significant bit (MSB) position of one or both of the I and Q data words;

determine which, if any, of the bit-shifted I and Q data words is greatest in value;

assign, if one of the bit-shifted I and Q data words is greater than the other, the greatest of the bit-shifted I and Q data words as the numerator data word of a ratio and the other of the bit-shifted I and Q data words as the denominator data word of the ratio;

indicate, only in response to the I data word being assigned as the numerator data word and the Q data word being assigned as the denominator data word, an operand swap; and add the operand swap indication to the information obtained during the transforming so that the mapping can subtract the retrieved angle from 90°.

16. The apparatus of claim 15, wherein the processor is further configured to:

identify the set of bits as a set of bits from the numerator data word and another set of bits from the denominator data word, where the set of numerator bits and the set of denominator bits are identified in accordance with the constraints under which the memory table was populated;

perform bit operations using the set of numerator bits and the set of denominator bits as operands, the bit operations being specified by the constraints under which the memory table was populated; and generate the key from results of the bit operations in accordance with the constraints under which the memory table was populated.

17. The apparatus of claim 16, wherein the processor is further configured to:

store results of a first set of the bit operations that defines an angular region in the complex number plane in accordance with the constraints under which the memory table was populated;

store results of a second set of the bit operations that establishes an angle within the angular region to within the specified neighborhood of a computed arctangent of the ratio, the first set of bit operations and the second set of bit operations being specified by the constraints under which the memory table was populated; and concatenate the results of the first set of the bit operations with the results of the second set of the bit operations to form the key.

18. The apparatus of claim 17, wherein the first set of bit operations generates an indication as to whether the identified bits in the numerator data word are respectively equal to the identified bits in the denominator data word.

19. The apparatus of claim 17, wherein the second set of bit operations replicates the identified bits in the numerator data word.

20. The apparatus of claim 12, wherein the processor is further configured to:

receive a plurality of baseband symbols at each of the sample times, each of the baseband symbols comprising an I data word and a Q data word;

precondition the baseband symbols in accordance with a signal combining scheme to produce the symbol.

21. The apparatus of claim 20, wherein the processor is further configured to:

weight the I and Q data words of each of the baseband symbols by a corresponding coefficient in accordance with the signal combining scheme;

sum the weighted I data words of the baseband symbols as the I data word of the transmission symbol; and sum the weighted Q data words of the baseband symbols as the Q data word of the transmission symbol.

22. The apparatus of claim 21 further comprising:

a transmitter to transmit the phase-encoded signal as a constant envelope radio-frequency (RF) communication signal.

23. A tangible non-transitory computer readable medium having encoded thereon instructions that, when executed by a processor, configure the processor to:

store a memory table in memory having a plurality of angles in respective storage locations identified by respective keys, each angle in the memory table being established in accordance with constraints under which the memory table was populated so as to be mapped to a phase angle that is within a specified neighborhood about coordinates of a symbol in a complex number plane;

generate a key at each of a plurality of sample times from a prescribed set of bits in respective symbols obtained at each of the sample times, each of the symbols comprising an in-phase (I) digital data word and a quadrature phase (Q) digital data word identifying the coordinates thereof in the complex number plane;

retrieve an angle from the memory table at each of the sample times at the storage location therein identified by the generated key; and generate a signal to convey the symbols as phase differentials at each of the sample times between a reference phase and the phase angle.

* * * * *